United States Patent
Baiz et al.

(10) Patent No.: US 10,041,524 B1
(45) Date of Patent: Aug. 7, 2018

(54) LUG NUT SYSTEM

(71) Applicants: Enrique J. Baiz, Miramar, FL (US); Osvaldo Izquierdo, Homestead, FL (US)

(72) Inventors: Enrique J. Baiz, Miramar, FL (US); Osvaldo Izquierdo, Homestead, FL (US)

(*) Notice: Subject to any disclaimer, the term of this patent is extended or adjusted under 35 U.S.C. 154(b) by 3 days.

(21) Appl. No.: 15/383,955

(22) Filed: Dec. 19, 2016

(51) Int. Cl.
*F16B 37/14* (2006.01)
*B60B 27/06* (2006.01)
*F16B 41/00* (2006.01)

(52) U.S. Cl.
CPC ............ *F16B 37/14* (2013.01); *B60B 27/065* (2013.01); *B60B 2900/572* (2013.01); *F16B 41/005* (2013.01)

(58) Field of Classification Search
CPC ............................... F16B 37/14; F16B 41/005
USPC .................................................. 411/429, 910
See application file for complete search history.

(56) References Cited

U.S. PATENT DOCUMENTS

| | | | | |
|---|---|---|---|---|
| 4,406,140 | A * | 9/1983 | Wolter | F16B 41/005 70/231 |
| 5,074,730 | A * | 12/1991 | Duran | F16B 5/0208 411/103 |
| 7,713,012 | B2 * | 5/2010 | Coonjohn | B60R 11/00 411/372.6 |
| 8,016,535 | B1 * | 9/2011 | Roberts | F16B 41/005 411/373 |
| 9,151,315 | B2 * | 10/2015 | McPheeters | F16B 37/14 |
| 9,206,833 | B2 * | 12/2015 | Hunter | F16B 37/14 |
| 2008/0044254 | A1 * | 2/2008 | Wilson | F16B 23/0007 411/429 |
| 2008/0080955 | A1 * | 4/2008 | Liu | F16B 37/14 411/429 |

\* cited by examiner

*Primary Examiner* — Flemming Saether
(74) *Attorney, Agent, or Firm* — Quickpatents, LLC; Kevin Prince

(57) ABSTRACT

A lug nut system for a wheel includes a rigid body having at a first end a tapered rim and a threaded aperture adapted to engage at least one threaded stud of the wheel. The body includes a tool engagement section, and a threaded shaft at a second end of the body adapted for receiving an ornamental cap. A cover has a first open end, a sleeve adapted for fitting over the body, and a cap at a second end that includes an aperture for the threaded shaft of the body. Preferably the sleeve has a cylindrical inside surface, such that the sleeve is free to rotate when in place over the body, thereby inhibiting removal of the wheel. The cover further hides any tool marks on the tool engagement section of the rigid body.

10 Claims, 3 Drawing Sheets

LUG NUT SYSTEM

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to vehicle wheels, and more particularly to an improved wheel lug nut.

DISCUSSION OF RELATED ART

Lug nuts for vehicle wheels can quickly become marred with tool marks and scratches formed when using a lug nut tool to tighten and loosen such lug nuts. Further, lug nuts of the prior art typically do not include means by which an ornamental cap or other feature can be interchanged to provide a new look to the vehicle.

Therefore, there is a need for a system that provides a simple means of covering a tool engaging portion of such lug nuts so as to hide unsightly tool marks and scratches. Further, such a needed system would allow for the interchangeability of an ornamental cap or other feature. Such a needed invention would be relatively easy to install, would inhibit unauthorized removal of the wheel from the vehicle by covering the tool engagement portion of the lug nut. The present invention accomplishes these objectives.

SUMMARY OF THE INVENTION

The present device is a lug nut system for a wheel that includes at least one threaded stud and a tire hub having at least one tapered aperture. For example, such a wheel may be an automobile wheel having a plurality of threaded studs, onto which is bolted the tire hub at a plurality of the tapered apertures.

The lug nut system includes a rigid body having at a first end a tapered rim adapted to engage the at least one tapered aperture of the tire hub. The first end of the rigid body further includes a threaded aperture that is adapted to engage the at least one threaded stud of the wheel. The rigid body further includes a tool engagement section adapted for engagement with a lug nut tool. The rigid body further includes a threaded shaft at a second end of the body that is axially aligned with the rigid body. The threaded shaft is adapted for receiving one of a plurality of ornamental caps thereon.

A cover is further included that has a first open end, a sleeve adapted for fitting over the tool engagement section of the body, and a cap at a second end that includes an aperture for allowing the threaded shaft of the body to project therethrough. Preferably the sleeve has a cylindrical inside surface, such that the sleeve is free to rotate about the longitudinal axis of the body and threaded shaft when in place over the body, thereby inhibiting removal of the wheel.

As such, with the tire hub fixed with the wheel, the body may be rotationally fastened with the at least one threaded stud at the threaded aperture by use of the lug nut tool on the tool engagement section of the body until the tapered rim is fully engaged with the tapered aperture of the tire hub. Then the open end of the cover can then be slid over the body until the threaded shaft fully traverses the aperture in the second end of the cover, after which one of the ornamental caps can be screwed onto the threaded shaft to secure the cover to the body. In this way, tool marks evident on the tool engagement section of the rigid body are hidden from view.

The present invention is a lug nut system that provides a simple means of covering a tool engaging portion of such lug nuts so as to hide unsightly tool marks and scratches. Further, the present invention allows for the interchangeability of an ornamental cap or other feature. The present system is relatively easy to install, and inhibits unauthorized removal of the wheel from the vehicle by covering the tool engagement portion of the lug nut. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
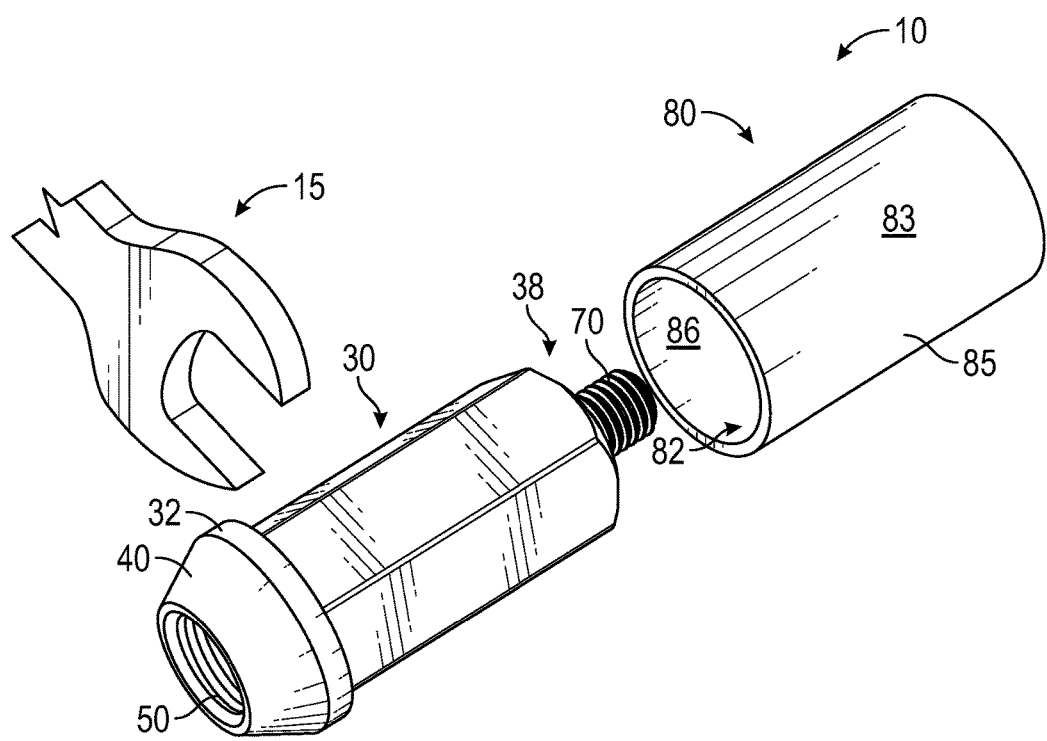
FIG. 1 is an exploded perspective view of the invention.
Figure 2:
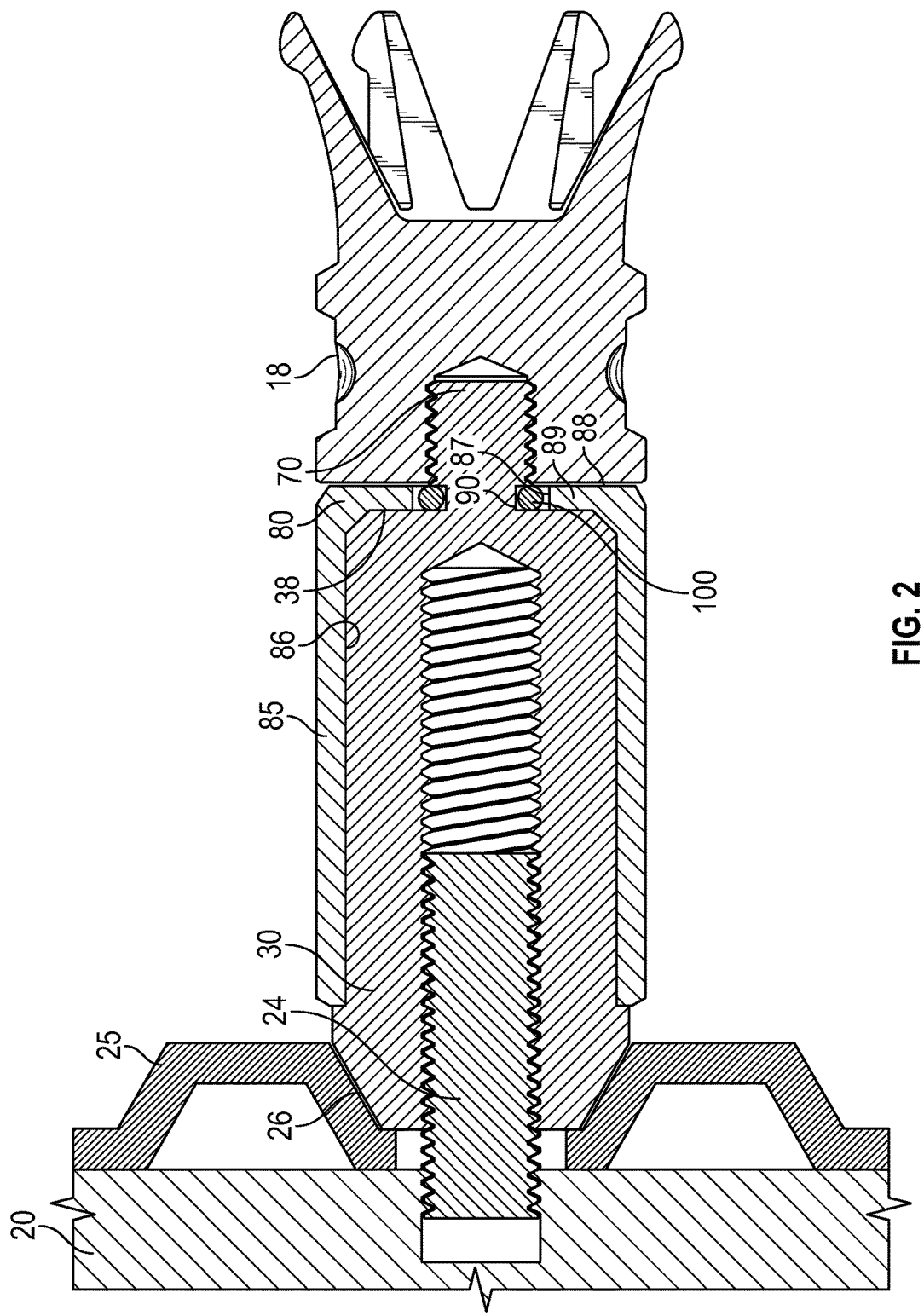
FIG. 2 is a cross-sectional view of the invention, taken along the longitudinal axis of a rigid body of the invention.
Figure 3:
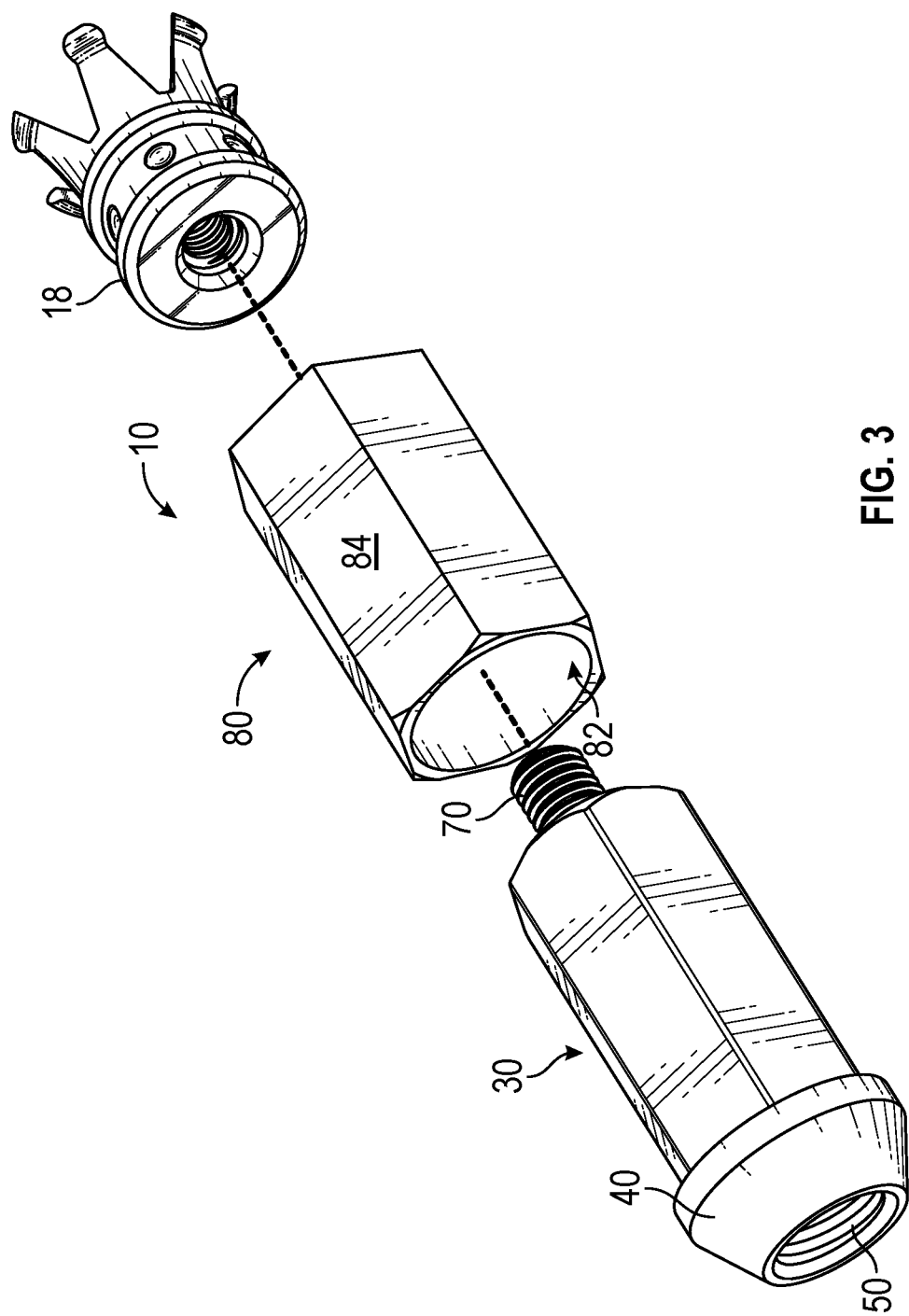
FIG. 3 is an alternate exploded perspective view of the invention.

FIGS. 1-3 illustrate a lug nut system 10 for a wheel 20 that includes at least one threaded stud 24 and a tire hub 25 having at least one tapered aperture 26. For example, such a wheel 20 may be an automobile wheel 20 having a plurality of threaded studs 24, onto which is bolted the tire hub 25 at a plurality of the tapered apertures 26.

The lug nut system 10 includes a rigid body 30 having at a first end 32 a tapered rim 40 adapted to engage the at least one tapered aperture 26 of the tire hub 25. The first end 32 of the rigid body 30 further includes a threaded aperture 50 that is adapted to engage the at least one threaded stud 24 of the wheel 20. Preferably the rigid body 30 is made from a strong metal material.

The rigid body 30 further includes a tool engagement section 60, such section preferably including a hexagonal cross-sectional shape adapted for engagement with a lug nut tool 15 (FIG. 1).

The rigid body 30 further includes a threaded shaft 70 at a second end 38 of the body 30 that is axially aligned with the rigid body 30. The threaded shaft 70 is adapted for receiving one of a plurality of ornamental caps 18 thereon (FIGS. 2 and 3). The ornamental caps 18 may be available separately from the lug nut system 10 of the present invention, or may be included as a set. The threaded shaft 70 may be further adapted to receive a set screw (not shown) radially therein, such that ornamental caps 18 having radial set screws may be tightened to prevent removal of the ornamental cap 18 without having a matching set screw removal tool, thereby further inhibiting the removal of the hub 25 from the wheel 20.

A cover 80 is further included that has a first open end 82, a sleeve 85 adapted for fitting over the tool engagement section 60 of the body 30, and a cap 89 at a second end 88 that includes an aperture 87 for allowing the threaded shaft 70 of the body 30 to project therethrough. The sleeve 85 may have a cylindrical outside surface 83 (FIG. 1), a hexagonal outside surface 84, or the like. Preferably the sleeve 85 has a cylindrical inside surface 86, such that the sleeve 86 is free to rotate about the longitudinal axis of the body 30 and threaded shaft 70 when in place over the body 30. Preferably the cover 80 is made from a rigid metal or plastic material. The cover 80 may be anodized or otherwise colored either differently than or the same as the rigid body 30.

As such, with the tire hub fixed with the wheel 20, the body 30 may be rotationally fastened with the at least one threaded stud 24 at the threaded aperture 50 through the use of the lug nut tool 15 or the like on the tool engagement section 60 of the body 30 until the tapered rim 40 is fully engaged with the tapered aperture 26 of the tire hub 25. Then the open end 82 of the cover 80 can be slid over the body 30 until the threaded shaft 70 fully traverses the aperture 87 in the second end 88 of the cover 80, after which one of the ornamental caps 18 can be screwed onto the threaded shaft 70 to secure the cover 80 to the body 30. In this way, tool marks evident on the tool engagement section 60 of the rigid body 30 are hidden from view.

In one embodiment, the threaded shaft 70 of the body 30 includes a neck portion 90 immediately adjacent the body 30 (FIG. 2). An elastomeric O-ring 100 is preferably fixed about the neck portion 90. The elastomeric O-ring 100 imparts a slight spring force against the ornamental cap 18 when in-use to inhibit the ornamental cap 18 from becoming loosened during use. The threaded shaft 70 may terminate at the neck portion 90 to prevent the ornamental cap 18 from pressing against the cover 80, such that the cover 80 is free to rotate about the longitudinal axis of the body 30 and the threaded shaft 70.

While a particular form of the invention has been illustrated and described, it will be apparent that various modifications can be made without departing from the spirit and scope of the invention. For example, other cross-sectional shapes for the cover 80 may be included apart from cylindrical and hexagonal. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A lug nut system for a wheel that includes at least one threaded stud and a tire hub having at least one tapered aperture, comprising:
    a rigid body having at a first end a tapered rim adapted to engage the at least one tapered aperture of the tire hub and a threaded aperture adapted to engage the at least one threaded stud, a hexagonal tool engagement section adapted for engagement with a lug nut tool, and a threaded shaft at a second end of the body and axially aligned therewith, the threaded shaft adapted for receiving one of a plurality of ornamental caps thereon; and
    a cover having a first open end, a sleeve adapted for fitting over the tool engagement section of the body, and a cap at a second end that includes an aperture for allowing the threaded shaft of the body to project therethrough;

whereby with the tire hub fixed with the wheel, the body may be rotationally fastened with the threaded stud through use of the lug nut tool on the tool engagement section of the body until the tapered rim is fully engaged with the tapered aperture of the rim, after which the open end of the cover is slid over the body until the threaded shaft fully traverses the aperture in the second end of the cover, after which one of the ornamental caps is screwed onto the threaded shaft.

2. The lug nut system of claim 1 wherein the sleeve of the cover has a cylindrical outside surface.

3. The lug nut system of claim 1 wherein the sleeve of the cover has a hexagonal outside surface.

4. The lug nut system of claim 1 wherein the sleeve of the cover has a cylindrical inside surface, whereby the sleeve is free to rotate about the longitudinal axis of the body and threaded shaft.

5. The lug nut system of claim 1 wherein the body is made from a rigid metal material.

6. The lug nut system of claim 5 wherein the cover is made from a rigid metal material.

7. The lug nut system of claim 1 wherein the cover is made from a rigid metal material.

8. The lug nut system of claim 1 wherein an outside surface of the cover and the body have contrasting colors.

9. The lug nut system of claim 1 wherein the threaded shaft of the body includes a neck portion immediately adjacent the body, and further including an elastomeric O-ring fixed about the neck.

10. The lug nut system of claim 9 wherein the threads of the threaded shaft terminate at the neck portion to prevent the ornamental cap from pressing against the cover, whereby the cover is free to rotate about the longitudinal axis of the body and threaded shaft.

* * * * *